(12) United States Patent
Inaki et al.

(10) Patent No.: US 6,723,386 B2
(45) Date of Patent: Apr. 20, 2004

(54) FLUORORESIN-COATED QUARTZ GLASS JIG AND METHOD FOR PRODUCING THE SAME

(75) Inventors: Kyoichi Inaki, Tokorozawa (JP); Itsuo Araki, Kikuchi (JP)

(73) Assignees: Heraens Quaraglas GmbH & Co. KG, Hanau (DE); Shin-Etsu Quartz Products Co., Tokyo (JP)

( * ) Notice: Subject to any disclaimer, the term of this patent is extended or adjusted under 35 U.S.C. 154(b) by 124 days.

(21) Appl. No.: 10/006,827

(22) Filed: Dec. 4, 2001

(65) Prior Publication Data

US 2002/0106518 A1 Aug. 8, 2002

(30) Foreign Application Priority Data

Dec. 5, 2000 (JP) ........................ 2000-369534

(51) Int. Cl.[7] ................................. B05D 3/00
(52) U.S. Cl. .................................... 427/389.7
(58) Field of Search ........................ 427/389.7

(56) References Cited

U.S. PATENT DOCUMENTS 4,068,814 A * 1/1978 Anthony et al. ......... 248/176.1

FOREIGN PATENT DOCUMENTS

| JP | 07-089603 | | 4/1995 |
|----|-----------|---|--------|
| JP | 07-267679 | | 10/1995 |
| JP | 10-036140 | | 2/1998 |
| JP | 2000-16821 | * | 1/2000 |
| WO | WO 96/07199 | | 3/1996 |

OTHER PUBLICATIONS

Translation of JP 07–089603, Apr. 1995.*
Translation of JP 60–128623, Jul. 1985.*
Patent abstracts of Japan for 07–267679, Oct. 17, 1995.
Patent abstracts of Japan for 07–089603, Apr. 4, 1995.
Patent abstracts of Japan for 10–036140, Feb. 10, 1998.

* cited by examiner

Primary Examiner—Erma Cameron
(74) Attorney, Agent, or Firm—Tiajoloff & Kelly; Andrew L. Tiajoloff

(57) ABSTRACT

An object of the present invention is to provide a fluororesin-coated quartz glass jig free from peeling off of fluororesin coating on using hydrofluoric acid or from generating particles due to the etching of quartz glass, while yet preventing the generation of chipping by relaxing the impact imposed on the quartz glass by silicon wafers. It also is an object of the present invention to provide a production method of the fluororesin-coated quartz glass jig. The object above is achieved by a fluororesin-coated quartz glass jig the surface thereof is wholly covered with a pinhole-free fluororesin coating, and by a method for producing the same.

3 Claims, No Drawings

FLUORORESIN-COATED QUARTZ GLASS JIG AND METHOD FOR PRODUCING THE SAME

INDUSTRIAL FIELD OF APPLICATION

The present invention relates to a quartz glass jig for use in cleaning silicon wafers, and in further detail, it relates to a quartz glass jig whose surface is wholly covered with a pinhole-free fluororesin coating and to a method for producing the same.

PRIOR ART

Naturally occurring quartz glass jigs have been used heretofore for cleaning silicon wafers. As exemplified by a carrier boat for silicon wafers, such quartz glass jigs are generally provided with mechanically processed grooves to mount thereon the wafers. Mechanical processing comprises shaving the quartz glass surface by using a cutting jig having vapor deposited thereon abrasives such as of diamond; however, since micro cracks generate by the machining, there has been such a problem as the contamination of wafers, because residual impurities remain trapped inside the micro cracks. Furthermore, such quartz glass jigs are generally used together with hydrofluoric acid solution. However, the hydrofluoric acid solution penetrates into the micro cracks as to roughen the surface irregularities of the quartz glass; this causes inconveniences such as the formation of flaws on the silicon wafers, the generation of particles due to chipping of protruded portions of the surface, or the generation of fluorosilicates, which form from quartz glass dissolved into the hydrofluoric acid solution and the adhesion of the generated fluorosilicates as foreign matters on the silicon wafer. Moreover, there happened a problem of causing chipping on the edge portion of the silicon wafer due to the abutment thereof against the groove portion of the quartz glass carrier boat, in case the silicon wafer was placed into or outside from the quartz glass carrier boat. In order to overcome the problems above, in Japanese Patent Laid-Open No. 89603/1995 is proposed to cover the quartz glass claws of the work support arm for transferring the works with a fluororesin. However, in case of cleaning the silicon wafers, hydrofluoric acid has been found to penetrate from the edge plane into the work support arm for transferring the works, and to cause peeling off of the fluororesin coating; or, contaminating substances have been found to elute out from the edge portion into the hydrofluoric acid solution to cause contamination of the silicon wafer. Another problem has been found concerning the work support arm for transferring the works; that is, cracks tended to generate in the fluororesin coating from the edges of the jigs to impair the adhesiveness of the coating on the quartz glass, and this caused separation of the fluororesin coating from the quartz glass in case the jigs were used for a long time.

PROBLEMS THE INVENTION IS TO SOLVE

In the light of the aforementioned circumstances, the present inventors performed extensive studies on the quartz glass jigs for use in cleaning silicon wafers. As a result, they have found that, by forming a pinhole-free fluororesin on the entire surface of the quartz glass, the direct contact of the quartz glass with the hydrofluoric acid solution can be prevented from occurring. This avoided the peeling off of the fluororesin coating or the generation of particles attributed to the etching of the quartz glass, while relaxing the impact on the quartz glass imposed by silicon wafers, thereby preventing the generation of chipping. Additionally, it has been found that, by previously applying rounding working to the edges of the quartz glass jig or by further applying frost treatment to the surface of the quartz glass before forming the fluororesin coating above, the adhesiveness of the fluororesin coating to the surface of the quartz glass can be further improved in such a manner that the fluororesin coating can be prevented from being peeled off even in case the quartz glass jig is immersed in a hydrofluoric acid solution for a long duration of time. The present invention has been accomplished based on these findings.

More specifically, an object of the present invention is to provide a fluororesin-coated quartz glass jig, said jig being free from causing peeling off of the fluororesin coating due to the use of hydrofluoric acid or from generating particles ascribed to the etching of quartz glass, and yet, said jig being relaxed from the impact in case a silicon wafer is brought into contact therewith and thereby devoid of generating chipping.

A further object of the present invention is to provide a method for producing the fluororesin-coated quartz glass jig above.

MEANS FOR SOLVING THE PROBLEMS

The objects above have been achieved by the present invention, and it provides a fluororesin-coated quartz glass jig characterized by that the surface thereof is wholly covered with a pinhole-free fluororesin-based resin coating, and a method for producing the same.

The fluororesin-coated quartz glass jigs according to the present invention refers to wafer carrier boats, chucks, etc., that are used in cleaning silicon wafers, such as, e.g., those shown in published PCT application WO 96/07199 published Mar. 7, 1996 and entitled "QUARTZ GLASS JIG FOR THE HEAT TREATMENT OF SILICON WAFERS AND METHOD AND DEVICE FOR PRODUCING SAME", which is herein incorporated by reference, and these jigs are characterized by having a surface wholly covered with a pinhole-free fluororesin coating. Usable as the fluororesins above are those having excellent heat resistance, chemical resistance, corrosion resistance, wear resistance, etc., and specifically mentioned is at least one resin selected from tetrafluoroethylene resin, tetrafluoroethylene-perfluoroalkyl vinyl ether resin, perfluoroethylene-propylene resin, ethylene-tetrafluoroethylene resin, chlorotrifluoroethylene resin, ethylene-chlorotrifluoroethylene resin, vinylidene difluoride resin, vinyl fluoride resin, and tetrafluoroethylene-perfluorodioxol resin. Particularly preferred among them is tetrafluoroethylene resin, because it has superior heat resistance, chemical resistance, corrosion resistance, and wear resistance. The fluororesin is dissolved in a solvent to prepare a fluororesin coating agent, and the resulting agent is applied to provide a coating having a dry thickness of 50 $\mu$m or thicker. If the thickness of the coating should be less than the thickness range specified above, not only the pinholes tend to generate in the coating as to allow the hydrofluoric acid solution to penetrate to the quartz glass to cause corrosion, but also the coating becomes extremely thin at the edge portions as to easily generate cracks. Hence, such a case is not preferred. The fluororesin coating can be formed by spraying the fluororesin coating agent or by applying the same employing the electrodeposition painting method. At any rate, the fluororesin coating agent is applied in a plurality of times to provide a pinhole-free coating until the required film thickness is achieved. Further preferred is to bake the coating. In particular, the edges are subjected to rounding to provide curved portions each having a curvature (r) of 0.5 mm or larger, such that the coating with sufficient thickness can be formed at the edges. The rounding can be carried out by a method comprising heating the edges with an oxyhydrogen flame, or by mechanically grinding the edges using a grinder and the like. As the solvent for use in dissolving therein the fluororesin, there can be mentioned an alkylene glycol such as propylene glycol, etc.; an ester such as methyl ethyl acetate, methyl butyl acetate, etc.; a ketone such as acetone, methyl isobutyl ketone, etc.; an alcohol such as ethylene alcohol, butyl alcohol, etc.; toluene, xylene, etc.

In order to further improve the adhesiveness of the fluororesin coating to quartz glass, preferred is to apply the fluororesin solution after subjecting the quartz glass surface to frost treatment. By applying frost treatment, irregularities are formed on the surface of the quartz glass, and the anchoring effect provided by those irregularities decreases the peeling off of the film by improving the adhesiveness of the fluororesin coating. As the frost treatment, there can be mentioned a method comprising blowing a crystalline silicon dioxide powder or SiC powder onto the surface of the quartz glass surface, or a method comprising forming irregularities on the surface of the quartz glass by using a chemical solution. Particularly preferred is a frost treatment using a chemical solution, because it can be performed without impairing the mechanical strength of the quartz glass and yet, free from generating micro cracks. As the chemical solution, there can be mentioned a solution containing hydrogen fluoride and ammonium fluoride, or a solution additionally containing acetic acid as described in Japanese Patent Laid-Open No. 267679/1995 or Japanese Patent Laid-Open No. 36140/1998. Frost treatment can be performed without any particular limitation concerning the surface roughness, but preferred is that the surface roughness value Ra falls within a range of from 1 to 10 $\mu$m, and that the value for Rmax should fall within a range of from 5 to 50 $\mu$m.

MODE FOR PRACTICING THE INVENTION

Examples for practicing the present invention are described below, but it should be understood that the present invention is not limited thereby.

EXAMPLES

Example 1

A 6-inch size quartz glass carrier boat (having provided with 4 groove bars) was prepared, and was subjected to rounding by blasting the surface thereof with crystalline silicon dioxide powder to obtain a boat with edges having an r-value of 2 mm. Subsequently, the entire quartz glass carrier boat was blasted with crystalline silicon dioxide powder 100 to 300 $\mu$m in particle size to thereby form irregularities having a surface roughness Ra of 2.5 $\mu$m and Rmax of 20 $\mu$m. The surface of the resulting quartz glass boat was further coated with a tetrafluoroethylene resin at a dry thickness of 400 $\mu$m by means of electrostatic coating. Then, 25 pieces of 6-inch silicon wafers were mounted on the thus obtained fluororesin-coated quartz glass carrier boat to perform RCA cleaning (combination cleaning, e.g., $HCl+H_2O_2$, $H_2SO_4+H_2O_2$, $NH_4OH+H_2O_2$) and were subjected to hydrofluoric acid pickling, rinsing with pure water, and to final drying using an IPA (isopropyl alcohol) drier. The particles remaining on the surface of the silicon wafer were counted by using a laser particle counter to find only about 50 particles residing on the peripheral portion of the silicon wafer.

Example 2

A 6-inch size quartz glass carrier boat (having provided with 4 groove bars) similar to that used in Example 1 was prepared, and was subjected to rounding to a r-value of 1 mm by applying oxyhydrogen flame heating to the edges. Subsequently, the quartz glass carrier boat was immersed into a chemical solution containing hydrofluoric acid and ammonium fluoride to form surface irregularities with Ra of 1.5 $\mu$m and Rmax of 13 $\mu$m. Then, tetrafluoroethylene resin was applied to the surface of the quartz glass carrier boat by means of electrostatic coating to obtain a film with a dry thickness of 200 $\mu$m. Then, 25 pieces of 6-inch silicon wafers were mounted on the thus obtained fluororesin-coated quartz glass carrier boat to perform RCA cleaning, and were subjected to hydrofluoric acid pickling, rinsing with pure water, and to final drying using an IPA drier. The particles remaining on the surface of the silicon wafer were counted by using a laser particle counter in a manner similar to that described in Example 1, but only about 20 particles were found residing on the peripheral portion of the silicon wafer.

Comparative Example 1

A 6-inch size quartz glass carrier boat similar to that used in Example 1 was prepared, and was used in the cleaning of silicon wafers in a manner similar to that described in Example 1, except for forming the fluororesin coating. As a result, 700 particles were counted on the surface of the silicon wafer. The particles were found to generate on the central portion of the silicon wafer, and the production yield of the silicon wafer was decreased.

Comparative Example 2

A 6-inch size quartz glass carrier boat similar to that used in Example 1 was prepared, and the edges of the groove portions were heated by oxyhydrogen flame to perform rounding to an r-value of 1 mm. Then, the resulting quartz glass carrier boat was blasted with crystalline silicon dioxide powder of 100 to 300 $\mu$m in particle size to thereby form irregularities having a surface roughness Ra of 2.5 $\mu$m and Rmax of 20 $\mu$m. Subsequently, by means of electrostatic coating, tetrafluoroethylene resin coating of 400 $\mu$m in thickness was formed only on the surface of the groove portions of the resulting quartz glass boat. Cleaning of silicon wafers was performed in a manner similar to that described in Example 1 to observe about 20 particles remaining on the peripheral portions of the silicon wafers. However, with repeated cleaning, the hydrofluoric acid solution was found to penetrate from the edge portion of the fluororesin coating as to cause peeling off of the fluororesin coating on carrying out the tenth cleaning.

EFFECT OF THE INVENTION

The fluororesin-coated quartz glass jig according to the present invention is wholly covered with a pinhole-free fluororesin coating, and it enables cleaning treatment of silicon wafers without causing peeling off of the coating or contaminating silicon wafers with particles and the like. Hence, the present invention is of high industrial value in that it realizes the production of silicon wafers at high yield.

What is claimed is:

1. A method for producing a fluororesin-coated quartz glass jig, said method comprising:

rounding all edges of a quartz glass jig into curved portions each having a radius of curvature of 0.5 mm or larger, and forming a fluororesin coating on the entire quartz glass jig by treating the resulting jig with a fluororesin coating agent; and wherein the fluororesin coating has a thickness of 50 μm or more.

2. A method according to claim 1, wherein the fluororesin coating on the quartz glass jig is pinhole-free.

3. A method according to claim 1, wherein the fluororesin coating is of at least one resin selected from the group consisting of tetrafluoroethylene resin, tetrafluoroethylene-perfluoroalkyl vinyl ether resin, perfluoroethylene-propylene resin, ethylene-tetrafluoroethylene resin, chlorotrifluoroethylene resin, ethylene-chlorotrifluoroethylene resin, vinylidene difluoride resin, vinyl fluoride resin, and tetrafluoroethylene-perfluorodioxol resin.

* * * * *

UNITED STATES PATENT AND TRADEMARK OFFICE
CERTIFICATE OF CORRECTION

PATENT NO. : 6,723,386 B2
DATED : April 20, 2004
INVENTOR(S) : Kyoichi Inaki et al.

It is certified that error appears in the above-identified patent and that said Letters Patent is hereby corrected as shown below:

<u>Title page,</u>
Item [73], Assignee, "Heraens Quaraglas GmbH & Co. KG" should read -- Heraeus Quarzglas GmbH & Co. KG --.

Signed and Sealed this

Sixteenth Day of November, 2004

JON W. DUDAS
*Director of the United States Patent and Trademark Office*